United States Patent [19]

Mack

[11] 4,289,679
[45] Sep. 15, 1981

[54] METHOD FOR PRODUCING SOLUTIONS OF DRAG REDUCING SUBSTANCES

[75] Inventor: Mark P. Mack, Ponca City, Okla.
[73] Assignee: Conoco, Inc., Ponca City, Okla.
[21] Appl. No.: 103,317
[22] Filed: Dec. 14, 1979
[51] Int. Cl.³ ............................. C08J 3/08; C08K 5/01
[52] U.S. Cl. ............................. 260/33.6 PQ; 260/34.2; 528/497; 528/498
[58] Field of Search ................. 260/34.2, 33.6 PQ; 528/497, 498

[56] References Cited

U.S. PATENT DOCUMENTS 3,808,169  4/1974  Osmond et al. ................. 260/34.2
3,891,593  6/1975  Smitherman, Jr. et al. ....... 260/33.6 PQ
3,965,018  6/1976  Heilman et al. ................. 260/33.6 PQ

*Primary Examiner*—Allan Lieberman
*Attorney, Agent, or Firm*—Cortlan R. Schupbach, Jr.

[57] ABSTRACT

A method of producing ultra-high molecular weight polymers useful as drag reducing substances or antimist agents comprising;

(1) polymerizing an alpha-olefin or olefins from 2 to 30 carbon atoms with a Ziegler catalyst in a light hydrocarbon solvent;
(2) adding a heavy hydrocarbon diluent or a non-solvent suspending agent to the resulting polymer or copolymer mixture, and
(3) removing substantially all of the light hydrocarbon component.

5 Claims, No Drawings

METHOD FOR PRODUCING SOLUTIONS OF DRAG REDUCING SUBSTANCES

This invention relates to a method for preparing drag reducing substances. More particularly, this invention relates to an improved method for preparing these substances by polymerizing an alpha olefin or olefins with a Ziegler catalyst system in a light hydrocarbon solvent, adding the polymerization mixture to a heavy hydrocarbon diluent, then removing substantially all of the light hydrocarbon components, leaving the drag reducing substance dissolved in the heavy hydrocarbon diluent.

Drag reducing substances are well known in the art. Such reducers are taught in U.S. Pat. No. 3,493,000 and U.S. Pat. No. 3,692,676. Anti-mist agents are shown in U.S. Pat. No. 4,173,455. These references are representative but far from exhaustive of a field which shows drag reducing materials. However, in all cases, these materials have been preprepared before use as drag reducing material. These materials are normally isolated, re-dissolved in a sample of the fluid which is to be passed through a conduit, then injected into the flowing fluid in order to reduce drag friction.

It would therefore be of great benefit to provide a method wherein the necessary isolation and redissolution can be avoided.

It is therefore an object of the present invention to provide an improved method for producing a drag reducing compound. Other objects will become apparent to those skilled in this art as the description proceeds.

It has now been found according to the present invention that an ultra-high molecular weight drag reducing substance or antimist agent can be formed by (1) polymerizing an alpha-olefin or alpha-olefins containing from 2 to 30 carbon atoms in the presence of a Ziegler catalyst system in a light hydrocarbon solvent, to form a polymer or copolymer in a polymerization medium;

(2) adding the polymerization medium to a heavy hydrocarbon diluent or a non-solvent suspending agent, and;

(3) removing substantially all of the light hydrocarbon components.

The drag reducing material which is produced by the polymerization is then left dissolved or suspended in the heavy hydrocarbon diluent or suspending agent, which can be added to a conduit containing the same or different hydrocarbons for drag reduction.

The addition of water or surfactants to a polymer solution is well known. This art is exemplified by U.S. Pat. Nos. 3,427,370; 3,703,502; 3,527,741; and 3,608,611. In addition, U.S. Pat. No. 3,772,262 shows steam stripping to recover polymer, while U.S. Pat. No. 3,968,067 shows the use of water to recover polymer from polymerization solutions. However, none of these references show the concept of introducing a polymerization medium containing polymer into a heavy hydrocarbon diluent then recovering light hydrocarbons from the mixture, leaving the polymer dissolved in the heavy hydrocarbon diluent.

Thus the instant invention relates to the preparation of polymeric drag reduction substances and antimist agents. It is well known that alpha olefins can be polymerized to high molecular weight polymers by employing a catalyst of the Ziegler/Natta classification. The catalyst system basically comprises a transition metal compound and an organometallic alkylating agent. Modifiers or additives can be added to alter or improve the performance of the basic Ziegler/Natta catalyst in the particular system desired.

There exist components which increase the stereospecificity and/or rate of the polymerization reaction. In addition, there are modifiers which reduce the molecular weight of such polymers; for example, by the addition of hydrogen during the polymerization. The property of ultrahigh molecular weight renders a polymer difficult to process due to its high viscosity and melting point. However, the property of ultra high molecular weight is desirable in other applications. Polymeric substances of ultra high molecular weight (on the order of greater than $10^6$ molecular weight units) have the capacity to reduce drag in pumpable fluids. At a given rate, the percent drag reduction is defined as a change of pressure in the line with and without the substance. This is set forth in the equation below.

$$\% \; Drag \; Reduction = (\Delta P - \Delta Pr)/\Delta P \times 100$$

wherein $\Delta P$ is the pressure drop of the transported hydrocarbon fluid $\Delta Pr$ is the delta drop of the polymer solution. This test for drag reduction is set forth in U.S. Pat. No. 3,692,676 hereby incorporated in its entirety by reference. Thus it is apparent that a high molecular weight polymer has a greater capacity to influence the turbulent flow in the pipeline than a polymer of low molecular weight.

The present invention provides for the preparation of such polymers, copolymers, and terpolymers characterized by both ultrahigh molecular weight and hydrocarbon solubility. The objects of this invention are achieved by contacting under suitable conditions as alpha olefin or olefins with either a basic Ziegler/Natta catalyst system or a modified one wherein the catalyst system is activated chemically and/or physically prior to polymerization of the olefins, such polymerization carried out in a light hydrocarbon solvent, adding a heavy hydrocarbon diluent to the resulting polymer mixture, and removing a substantial portion of the light hydrocarbon component and/or unreacted volatile olefin from the mixture.

There are a large number of Ziegler catalyst systems which can be used in the instant invention. The basic catalyst system comprises a mixture of a compound of a metal of groups IV-B, V-B, VI-B, VII-B or VIII from the periodic table of elements in combination with an organometallic compound of an alkali metal, alkaline earth metal, boron, aluminum, or zinc. Especially useful are the titanium halides and the organoaluminum combinations. A preferred catalyst mixture would consist of $TiCl_3.\frac{1}{3}AlCl_3$ and diethylaluminum chloride (DEAC). Reactions are normally carried out at temperatures of from about 25° C. to about 100° C. and pressures of from less than 1 atmosphere to as high as 10 atmospheres. The polymerization is carried out to the extent desired, which may vary anywhere from 5% to essentially complete polymerization of the monomers in the system.

By definition, the "heavy" hydrocarbons referred to in the instant invention have boiling points higher than the "light" hydrocarbons. The light hydrocarbons, however, must be of sufficient purity to be used as polymerization diluents. The heavy hydrocarbons, in contrast, do not necessarily need to support polymerization reactions.

Thus, a light hydrocarbon is defined as a polymerization diluent with a boiling point or range less than that of the heavy hydrocarbon. The heavy hydrocarbon does not necessarily need to be a polymerization grade while the light hydrocarbon is required to be able to support the Ziegler/Natta polymerization reaction and be volatile with respect to the heavy hydrocarbon. The boiling point differences between the light and heavy hydrocarbons should be greater than 5° C. It is preferred, of course, that these differences be as great as possible to provide an effective separation at the conclusion of the process.

The polymerization of the alpha olefin or olefins can be carried out in a non-solvent system such as in the liquid monomers themselves. Normally, the polymerization is carried out in an inactive solvent such as inert alphatic hydrocarbons, aromatic hydrocarbons, aliphatic halides, aromatic halides, fluorocarbons, and silicon compounds. However, it is strictly a matter of choice in the individual process.

Representative examples of light hydrocarbons are volatile alpha olefins such as ethylene, propylene, or butene-1; branched or straight chained aliphatic hydrocarbons such as ethane, propane, butane, isobutane, pentane, hexane, heptane, octane, 2,2-dimethylbutane, 2,3-dimethylbutane, 2,2-dimethylheptane, 2,5-dimethylhexane, 2,2-dimethylpentane, 2,3-dimethylpentane, 2,4-dimethylpentane, 3,3-dimethylpentane, 3-ethylpentane, hexamethylethane, hexanes, 2-methylbutane, 2-methylhexane, 2-methylpentane, and 3-methylpentane; alicyclic hydrocarbons such as cyclohexane, methylcyclopentane, and 1,2,3,4-tetrahydronaphthalene; liquid alpha-olefins such as hexene-1, heptene-1, octene-1, nonene-1, decene-1, and 4-methyl-1-pentene; aromatic hydrocarbon derivatives such as benzene, toluene, or xylene. It should be clearly understood that mixtures or analogues of these compounds can be used in the instant invention.

Desirable heavy hydrocarbons are those transported through conduits, and include crude oil even though the substance may have light components. Crude oil would be useful since the polymer would dissolve in the mixture and the mixture can then subsequently be used as an effective drag reducer. Also included under the category of heavy hydrocarbons are benzene, toluene, gasoline, diesel oil, jet fuel, low polynuclear aromatic mixtures, Molex raffinate solvents, etc. These materials have higher boiling points and flash points than the light hydrocarbons, but do not necessarily support the polymerization reaction.

It should be understood that under certain circumstances, the light hydrocarbon may be chosen from the heavy hydrocarbon list provided that a sufficient difference in boiling points between these materials exists to carry out the instant invention. It is emphasized that the lists are provided to show clearly definable reaction systems for carrying out the process of the instant invention. However, with sufficient differences in boiling point to allow separation, two substances from either list could conceivably be used as heavy and light hydrocarbons respectively.

In the preparation of antimist agents, fuels can be used as heavy hydrocarbons. A concentrated polymer/fuel solution is easily dissolved in the fuel, and the polymeric diluent is compatible with the fuel mixture.

The invention is more concretely described with reference to the example below wherein all parts and percentages are by weight unless otherwise specified. The example is provided to illustrate the instant invention and not to limit it.

EXAMPLE 1

Polymerization grade isobutane is condensed into a clean, dry 1.4 liter autoclave (approximately 300 ml). Diethylaluminum chloride (1.8 mmol) is added followed by the addition of di-n-butyl ether (0.15 mmol). Polymerization grade octene-1 (35 ml) is added under pressure of dry argon and the polymerization is initiated with titanium trichloride catalyst of the Stauffer Type 1.1 (0.1174 grams, $TiCl_3 \cdot \frac{1}{3}AlCl_3$). The temperature of the autoclave is adjusted to $15 \pm °C$. and the mixture is agitated at about 290 revolutions per minute (rpm). The stirrer is switched off when the polymerization medium is viscous enough to suspend the catalyst particles.

After about 10.2 hours of polymerization, the mixture is pressured into a second autoclave containing 300 ml of Molex raffinate (Trademark of Universal Oil Products) and 1.7 ml of a 15 weight percent butylated hydroxy toluene/isopropyl alcohol solution. The alcohol solution deactivates the purple catalyst and the polymer is stabilized by the butylated hydroxy toluene antioxidant. Molex (Trademark of Universal Oil Products Corporation) raffinate is a kerosene-like solvent produced by Conoco Inc. The material contains branched hydrocarbon chains with a high aromatic content. The molecular weight range is very similar to kerosene.

The polymer is allowed to mix in this solvent system. The material is agitated in the raffinate/isobutane mixture at a low rpm setting to minimize shear degragation of the polymer. Intense agitation would result in the polymer having low molecular weight; this property would affect the material's drag reducing qualities. The mixing is conducted under pressure to contain the volatile solvent components such as isobutane.

When the raffinate and isobutane mixture is combined, the pressure is relieved and the mixture is warmed to remove by distillation the volatile isobutane. The material can then be recycled back into the first autoclave and used in subsequent polymerizations.

In determining weight percent of polymer produced, 75 grams of the poly(octene-1)/raffinate mixture is placed into 400 ml of isopropanol with sufficient mixing to precipitate an amorphous material containing poly(octene-1).

The substance is washed with an additional 400 ml of isopropanol, filtered, and washed with 400 ml of methanol to remove catalyst residue. The poly(octene-1) is collected by vacuum filtration and dried in a vacuum oven overnight to produce about 2.5 grams of polymer.

The polymeric solution of poly(octene-1) in raffinate can be used as a drag reducing or antimist agent. The material is easily dissolved in flowing hydrocarbons such as crude oil or in fuel such as diesel oil. Alternatively, the solid polymer is difficult to dissolve in these mixtures. Attempts to increase dissolution rate tends to shear degrade the polymer, and performance drops. Thus, the process of the instant invention provides an improved method for obtaining a high molecular weight drag reducing material, pre-dissolved in desired heavy hydrocarbons by drag reduction or anti-mist properties.

While certain embodiments and details have been shown for the purpose of illustrating this invention, it will be apparent to those skilled in this art that various changes and modifications may be made herein without departing from the spirit or scope of the invention.

I claim:

1. An improved method for producing solution of ultrahigh molecular weight polymers, which polymers are useful as drag reducing substances or anti-mist agents, comprising
    (1) polymerizing an alpha olefin or mixtures of alpha olefins containing from 2 to 30 carbon atoms in the presence of a Ziegler/Natta catalyst system to at least 5% of the monomer present in a polymerization grade hydrocarbon diluent;
    (2) adding the polymerization mixture obtained to a relatively heavy hydrocarbon diluent having a boiling point difference from the polymerization mixture sufficient to allow separation; and
    (3) removing substantially all polymerization grade hydrocarbon components, leaving the polymer dissolved in the heavy hydrocarbon diluent.

2. A method as described in claim 1 wherein removal of substantially all the polymerization grade hydrocarbon components is accomplished by evaporation or fractional distillation.

3. A method as described in claim 1 wherein the reaction is carried out in a polymerization grade hydrocarbon solvent.

4. A method as described in claim 3 wherein the polymerization grade hydrocarbon solvent is selected from the group consisting of ethylene, propylene, butene-1, hexene-1, heptene-1, octene-1, nonene-1, decene-1, 4-methyl-1-pentene, ethane, propane, butane, isobutane, pentane, hexane, heptane, octane, 2,2-dimethylbutane, 2,3-dimethylbutane, 2,2-dimethylheptane, 2,5-dimethylhexane, 2,2-dimethylpentane, 2,3-dimethylpentane, 2,4-dimethylpentane, 3,3-dimethylpentane, 3-ethylpentane, hexamethylethane, hexanes, 2-methylbutane, 2-methylhexane, 2-methylpentane, and 3-methylpentane, cyclohexane, methylcyclopentane, and 1,2,3,4-tetrahydronaphthalene, benzene, toluene, and xylene.

5. A method as described in claim 4 wherein the heavy hydrocarbon is selected from the group consisting of crude oil, jet fuel, gasoline, and diesel fuel.

* * * * *